United States Patent
De Graaff et al.

(10) Patent No.: US 8,289,580 B2
(45) Date of Patent: Oct. 16, 2012

(54) IMAGE SCANNING AND PROCESSING SYSTEM, METHOD OF SCANNING AND PROCESSING AN IMAGE AND METHOD OF SELECTING ONE OF A PLURALITY OF MASTER FILES COMPRISING DATA ENCODING A SCANNED IMAGE

(75) Inventors: Anthonius A. J. De Graaff, Venlo (NL); Tjerk E. C. Hummel, Venlo (NL); Etienne L. M. E. Van Dorsselaer, Venlo (NL); Marc P. Schuwer, Eindhoven (NL)

(73) Assignee: Océ-Technologies B.V., Venlo (NL)

( * ) Notice: Subject to any disclaimer, the term of this patent is extended or adjusted under 35 U.S.C. 154(b) by 0 days.

(21) Appl. No.: 12/711,002

(22) Filed: Feb. 23, 2010

(65) Prior Publication Data
US 2010/0149554 A1 Jun. 17, 2010

Related U.S. Application Data

(63) Continuation of application No. 10/607,057, filed on Jun. 27, 2003.

(30) Foreign Application Priority Data

Jun. 28, 2002 (EP) ..................... 02078186

(51) Int. Cl.
*H04N 1/393* (2006.01)
(52) U.S. Cl. ........ 358/451; 358/452; 358/453; 382/298; 382/282; 382/276
(58) Field of Classification Search .................. 358/451, 358/452, 453; 382/298, 282, 276
See application file for complete search history.

(56) References Cited

U.S. PATENT DOCUMENTS

| | | | |
|---|---|---|---|
| 4,398,222 A | 8/1983 | Ogawa | |
| 4,688,190 A | 8/1987 | Bechtolsheim | |
| 5,479,206 A | 12/1995 | Ueno et al. | |
| 6,216,144 B1 * | 4/2001 | De Vogel | ...................... 715/203 |

(Continued)

FOREIGN PATENT DOCUMENTS

DE 19944687.3 9/1999

(Continued)

*Primary Examiner* — Jacky X Zheng
(74) *Attorney, Agent, or Firm* — Birch, Stewart, Kolasch & Birch, LLP

(57) ABSTRACT

An image scanning and processing system includes a scanner for generating a stream of data encoding a scanned image; a controller for controlling and processing data received from the scanner; and a file storage unit. In use, the stream of data is written to a master file saved in the file storage unit. The controller is configured to create a preview image with a lower data size than the scanned image from at least part of the data encoding the scanned image. The controller is configured to extract data encoding the preview image directly from the stream of data, and to write the extracted data to a thumbnail file. A method of scanning and processing an image, includes scanning an original and thereby generating a stream of data, encoding a scanned image, saving the scanned image in a master file, and creating a preview image with a lower data size than the scanned image from at least part of the data encoding the scanned image. Data encoding the preview image is extracted from the stream of data, and written to a thumbnail file.

18 Claims, 3 Drawing Sheets

U.S. PATENT DOCUMENTS

| | | | |
|---|---|---|---|
| 6,795,209 B1* | 9/2004 | Patton et al. | 358/1.18 |
| 7,110,152 B2* | 9/2006 | Johnston et al. | 358/538 |
| 7,302,118 B2* | 11/2007 | Liu et al. | 382/306 |
| 2002/0015447 A1* | 2/2002 | Zhou | 375/240.25 |
| 2002/0041718 A1* | 4/2002 | Ohmori | 382/298 |
| 2002/0067515 A1* | 6/2002 | Abe | 358/442 |
| 2002/0140987 A1 | 10/2002 | Ishikawa | |
| 2003/0076547 A1* | 4/2003 | Cheung | 358/474 |
| 2003/0231801 A1* | 12/2003 | Baggs et al. | 382/254 |

FOREIGN PATENT DOCUMENTS

| | | |
|---|---|---|
| EP | 0 589 724 A2 | 9/1993 |
| EP | 589724 A2 | 3/1994 |
| EP | 589724 A2 * | 3/1994 |
| JP | 7-23235 A | 1/1995 |
| JP | 11-296690 A | 10/1999 |
| JP | 2000-268163 A | 9/2000 |
| JP | 2002-152483 A | 5/2002 |
| JP | 2002-170113 A | 6/2002 |

* cited by examiner

IMAGE SCANNING AND PROCESSING SYSTEM, METHOD OF SCANNING AND PROCESSING AN IMAGE AND METHOD OF SELECTING ONE OF A PLURALITY OF MASTER FILES COMPRISING DATA ENCODING A SCANNED IMAGE

This application is a Continuation of co-pending application Ser. No. 10/607,057, filed on Jun. 27, 2003 and for which priority is claimed under 35 U.S.C. §120. This application claims, under 35 U.S.C. §119, the priority benefit of European Patent Application No. 02078186.0 filed on Jun. 28, 2002, the entire contents of which are herein fully incorporated by reference.

BACKGROUND OF THE INVENTION

1. Field of the Invention

The invention relates to an image scanning and processing system, comprising a scanner for generating a stream of data encoding a scanned image; a controller for controlling and processing data received from the scanner; and a file storage wherein, in use, the stream of data is written to a master file saved in the file storage and the controller is configured to create a preview image with a lower data size than the scanned image from at least part of the data encoding the scanned image.

The invention also relates to a method of scanning and processing an image, comprising scanning an original and thereby generating a stream of data, encoding the scanned image, saving the scanned image in a master file, and creating a preview image with a lower data size than the scanned image from at least part of the data encoding the scanned image. The invention also relates to a method of selecting one of a plurality of master files comprising data encoding a scanned image.

2. Discussion of the Related Art

When scanning a number of documents, for example for electronic archiving purposes or to create copies, it is desirable that an operator can check the scanned image to determine whether the scan is of high enough quality. It may be desirable, for instance to check whether the scan resolution is high enough to show all the details in a critical region. It is thus desired that the operator be able to select certain regions in the scanned image, and be able to view them at the resolution used to scan the original.

Examples of the above-mentioned method for scanning a document, and image scanning and processing system are known from European Patent Application Publication No. 0 589 724A. This publication relates to an electronic image processing system. In this system, an initial high-resolution image is held in a high capacity storing unit. The system comprises a small capacity high speed storing unit and is arranged to transfer portions of the initial high-resolution image to the small capacity high speed storing unit a portion at a time. The system also comprises a viewing store for storing data representing an image to be displayed and a monitor for displaying the image. The system is arranged to operate in a preview mode. In this preview mode, image data is down converted and written to a destination area for output to the viewing store. The down-conversion of the data is performed by the control processor.

In the prior art, if an operator wishes to select a section from the scanned image, a preview image of the entire scanned image would have to be created first. This requires processing of all the data comprised in the master file. From a display of the preview image, the user would be able to select a section of the scanned image. This could then be retrieved from the master file for display. But, such a process is time consuming and strains the processing capacity of the controller and its memory to the utmost. Additionally, if one wanted to check a second area, the whole process would have to be repeated again, rendering the system to be rather inefficient.

SUMMARY OF THE INVENTION

It is an object of the invention to provide a system and methods for respectively allowing handling of scanned images with a large data size in a speedy and efficient way.

It is another object of the invention to provide a system and method for scanning and processing images, which overcome problems and limitations of the related art.

These and other objects are achieved with the system according to an embodiment of the invention, wherein the controller is configured to extract data encoding the preview image from the stream of data, and to write the extracted data to a thumbnail file.

The method of scanning and processing an image according to an embodiment of the invention is provided wherein data encoding the preview image is extracted from the stream of data, and written to a thumbnail file. Thus, a small file is quickly made available. Even though it is a small file, it is representative of the entire area of the scanned image. Because it is created directly from the stream of data, it is available directly after, or even before the scanning is finished. It can be used for a quick check of the scanning process, in a graphical user interface to select part(s) of the scanned image, or visually to provide other information relating to the scanned image, without requiring processing of large amounts of data comprised in the master file.

In one embodiment, at least part of the preview image is displayed to an operator as a survey view in a window on a display. Thus, it is possible to perform a quick first check for obvious scanning errors, without loading any of the detailed information comprised in the master file. Original skew, scanning of the original in the wrong direction, or insertion of the original in a scanning array the wrong way up are all easily detectable.

In one embodiment, the part of the preview image is displayed before or during the saving to the thumbnail file. Thus, the first check can be performed at the earliest possible moment. This allows an operator to break off the scanning process before the entire original has been scanned.

In a preferred embodiment, part of the scanned image representing a region of interest is displayed to an operator as a detailed view of the region of interest in a window on a display. Thus, it is possible to perform a more detailed check of the scanned image stored in the master file, without having to retrieve the entire master file and process all the data contained therein. By checking a critical part of the scanned image, for example a part containing very finely spaced lines or small text, an impression can be gained whether all details in the original have been captured by the scanning process.

An embodiment of the method according to the invention comprises providing a selection frame in the survey view, wherein an operator selects the region of interest by sizing and positioning the selection frame in the survey view. Thus, it is possible to select and view any desired portion of the scanned image. Selection is extremely easy, since it can be done with reference to the scanned image, but it is not necessary to load the entire scanned image stored in the master file. Thus, resources are spared and time is saved according to the present invention.

In one embodiment of the invention, the part of the scanned image representing the region of interest is converted to a different data format before being displayed. Thus, it is possible not only to assess the quality of the scan, but also to see the effect that conversion of the data encoding the scanned image will have. This embodiment is particularly appropriate when scanning to file for archiving purposes. It allows selection of a suitable file format for storing the scanned image and/or for choosing scanning settings appropriate to the chosen file format.

In a further development of this embodiment, the part of the scanned image representing the region of interest is compressed when converted to the different data format and is decompressed before being displayed. Thus, it is possible for an operator to assess whether or not compressing the scanned image before storage and decompressing after retrieval will result in a poor rendering of the original image. It is thus possible to prevent loss of detail when storing to file in a compressed format for archiving purposes or for transmission of the scanned image. In each case, the entire scanned image need not be processed for the purpose of assessment by the operator. Rather, the operator can select a region of interest containing elements allowing him to form a judgement on the image quality. Only the data encoding this region of interest need be processed.

In an embodiment of the invention, the scanned image is checked for artifacts, and information specifying detected artifacts is provided with the preview image.

According to an aspect of the invention, a method of selecting one of a plurality of master files comprising data encoding a scanned image, which can be created using a method of scanning and processing images according to the present invention, is provided, wherein at least part of a thumbnail file comprising data encoding a preview image corresponding to the scanned image with a lower data size than the scanned image is sent to an archive manager, and wherein the archive manager displays the parts as survey previews to the user.

Thus a particularly responsive and informative user interface is provided for selecting archived images. Due to the survey previews, the user knows which image is stored in each master file. Because the thumbnail is already present, it is not necessary to scale down each master file in turn to build up the display.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be explained in further detail with reference to the accompanying drawings.

DETAILED DESCRIPTION OF THE PREFERRED EMBODIMENTS

Figure 1:
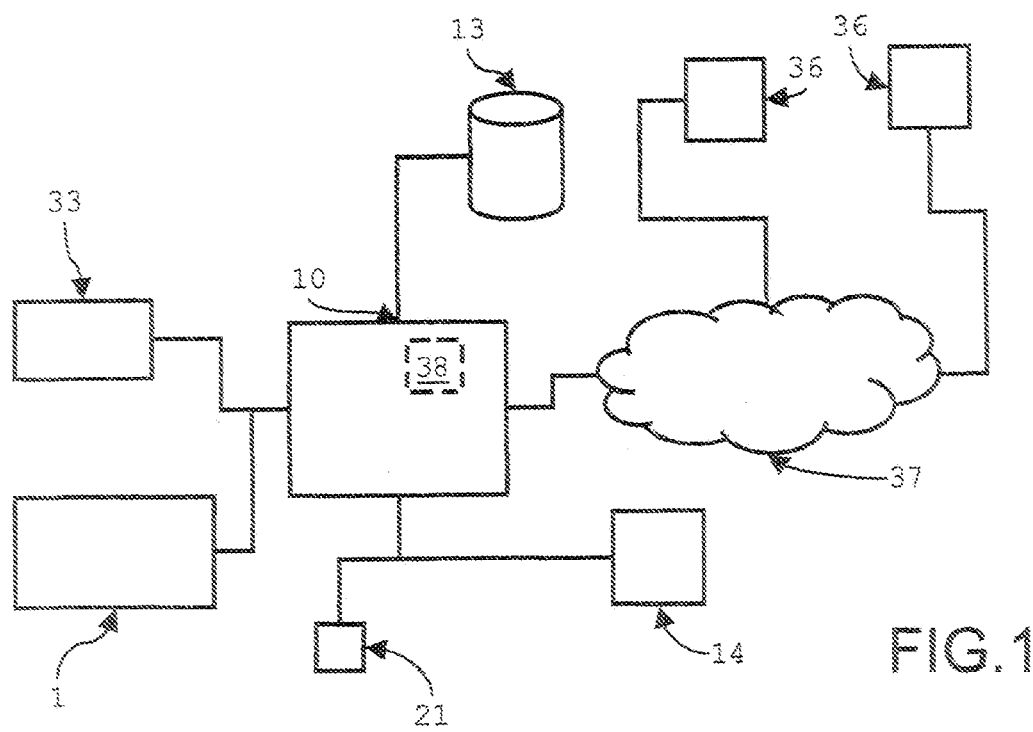
FIG. 1 is a simplified component diagram depicting an embodiment of a scanning and processing system according to the invention.

FIG. 1 is an example of a block diagram of a system for scanning and processing images according to an embodiment of the present invention. Referring to FIG. 1, the scanning and processing system according to the invention comprises a scanner 1 for scanning an original, a printing device 33, a controller 10, a file storage unit or means 13, one or more terminals 36 coupled with a network 37, an input unit or means 21, and a display unit or means 14, all operatively coupled. Some of these elements may be omitted depending on the application. For instance, if the originals are scanned for copying documents, then the printing device 33 is needed but the terminals 36 may not be needed. If the originals are scanned for electronic archiving, then the printing device 33 may not be needed and the terminals 36 may be needed.

Figure 2:
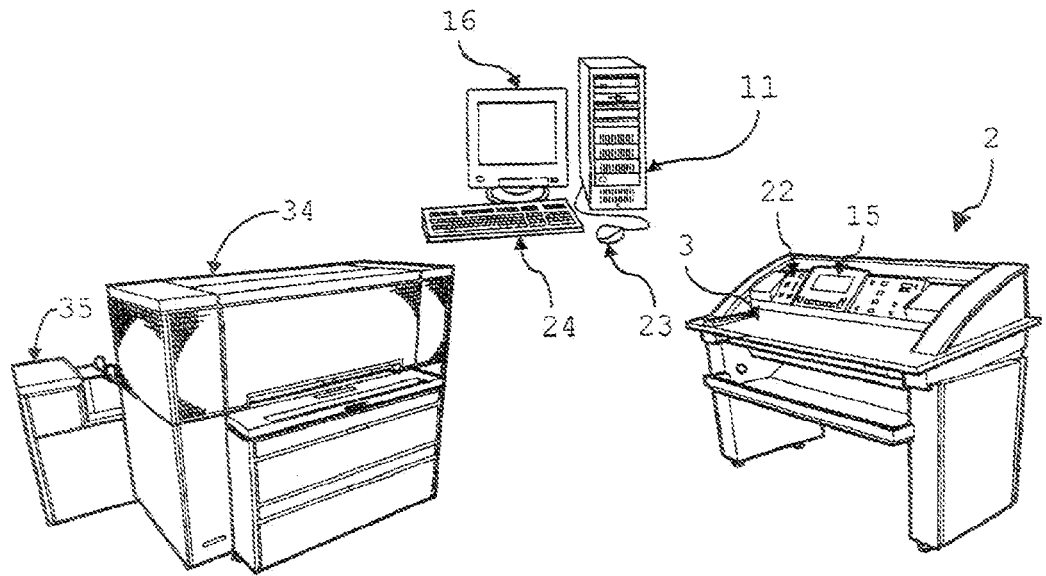
FIG. 2 is a schematic illustration of an embodiment of the system shown in FIG. 1.

The scanner 1 can be part of a copier or part of a stand-alone device. FIG. 2 shows an example of the scanner 1 of the latter type, as a scanning device 2. The scanning device 2 is a throughput scanner, meaning that it comprises a stationary scanning array, and a feeder mechanism for moving an original past the scanning array. The invention can, however, also be implemented using a flatbed-scanning device, in which the scanning array is moved across the original, or any other type of a scanning device.

Figure 3:
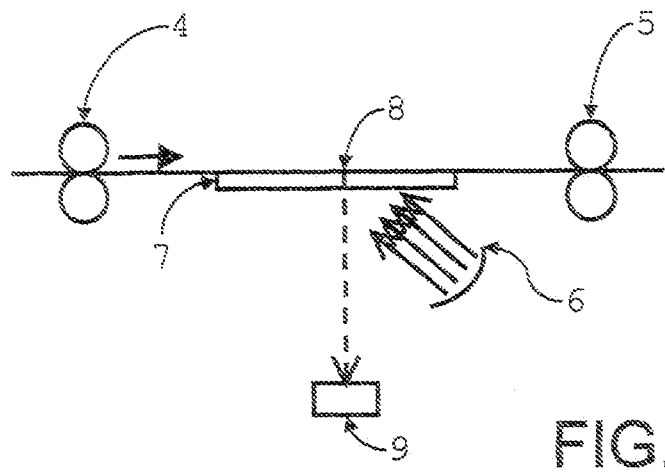
FIG. 3 is a schematic cross-sectional diagram of an embodiment of a scanning device for use in connection with the invention.

A schematic cross-sectional view of the scanning device 2 according to one embodiment of the present invention is shown in FIG. 3. As shown in FIGS. 2 and 3, the original is placed on an original table 3, and pulled through the device 2 by a feeder mechanism comprising two pairs 4, 5 of transport rollers. The device 2 further comprises a light source 6 and a transparent plate 7 for guiding the original sheet. The transparent plate 7 provides an exposure area 8. Light from the light source 6 is projected along an optical path (shown as a dashed line) onto a CCD array 9. The CCD array 9 is an array of charge coupled devices, but other types of light detecting devices may be used in lieu of the CCD array 9.

The invention can be used for scanning any type of image, on any type of original, but is particularly useful for scanning wide format originals comprising colour images with randomly distributed areas containing small details. Engineering drawings are a typical example of such originals. Although the maximum width of the original is determined by the width of the scanning array 9, the length is not limited by the physical dimensions of the scanning device 2.

The scanning device 2 is capable of scanning originals at several different resolutions and in several different colour modes. A 1-bit black-and-white mode is possible, but a 24-bit full colour mode is equally possible. In this case, each sample point results in a 24-bit data element. A DIN-A0 sized original, scanned in a 24-bit full colour mode at 600 dots per inch resolution, will result in the image on the original being encoded in approximately 1.6 Gbytes of data.

The controller 10 in the scanning and processing system is provided for controlling and processing the data received from the scanning array 9. The term "controller" in this context is used to denote a combination of hardware and software that performs specific functions in the scanning and processing system. This includes coordination of the various steps needed to scan and process an image, execution of a large number of these steps, and the directing of data streams between the various other components of the scanning and processing system.

In the system of FIG. 2, the controller 10 substantially comprises a series of software modules on a workstation 11. Alternatively, the controller 10 or part of the controller 10, could be comprised in the scanning device 2. In this embodiment, the workstation 11 is a computer with at least one processor, random access memory, a hard disk, and graphics and network cards.

In operation, the original sheet is transported by the pairs 4,5 of rollers along the transparent plate 7 and across the exposure area 8. The light source 6 illuminates the original sheet at the exposure area 8. An image line of the original document at the image plane is projected via the optical path on the CCD array 9. Electrical signals generated in the elements of the CCD array 9 in correspondence with the line image in the exposure area 8 are read out in parallel and placed in a line buffer. The line buffer is read out for further processing.

Figure 5:
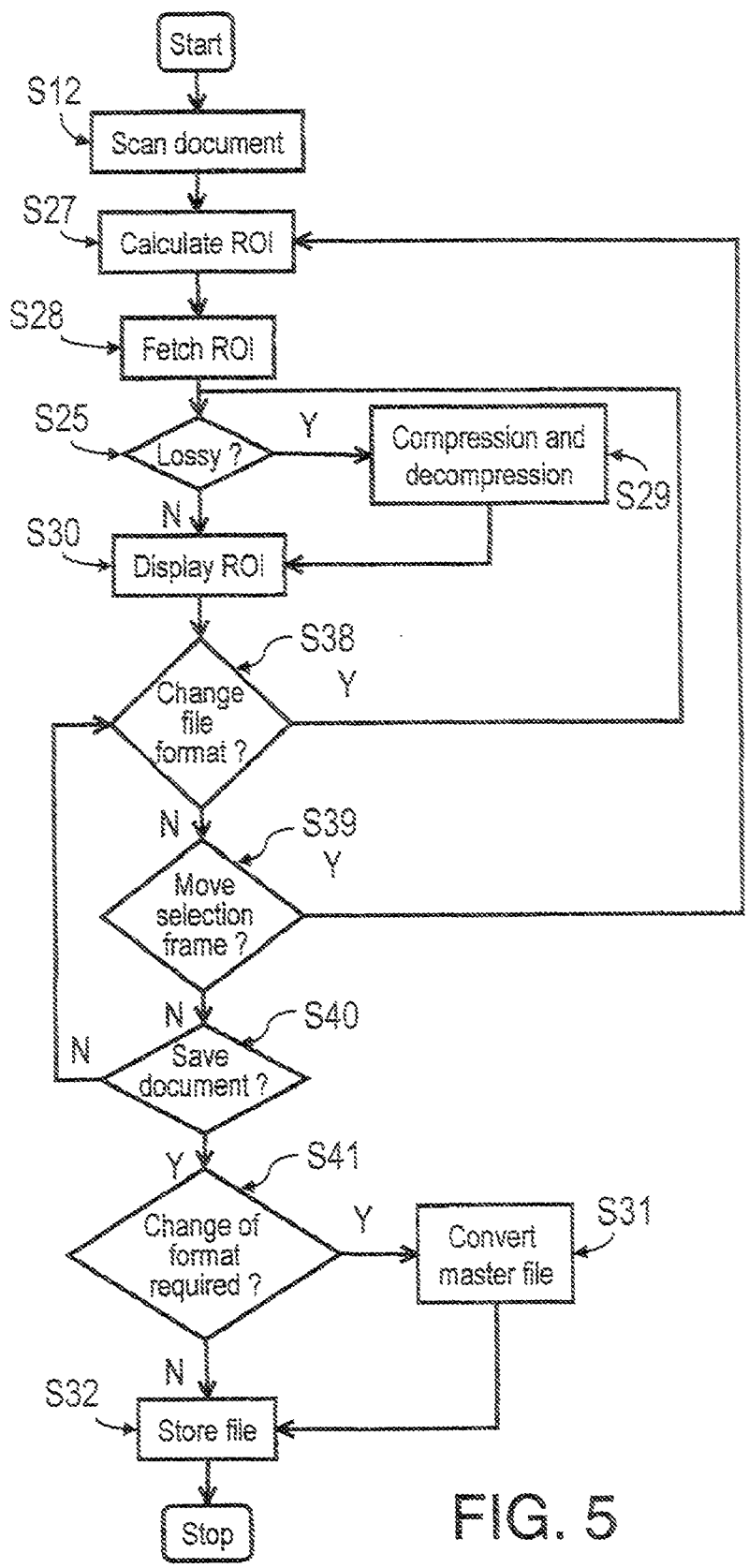
FIG. 5 is a flow diagram showing an embodiment of the method of scanning and processing images according to the invention.

In one embodiment, a method for scanning and processing images according to the invention is illustrated in FIG. 5, and is implementable in the system shown in FIG. 1 or 2. In a first step S12, the data encoding the scanned image is passed in a stream from the scanner 1 to the controller 10, where it is processed. According to the invention, the controller 10 creates a separate stream of data encoding a preview image with a lower data size from the stream of data coming from the scanner 1. In other words, the original image is scaled down.

There are a number of ways in which the original image can be scaled down. The invention can use any one of them. Pixel sub-sampling is a basic example of a scaling method. In the pixel sub-sampling, the bit map is resampled, e.g. for a scaling factor of 1:100, ninety-nine pixels over one are removed in both directions. This method has the advantage of being fast. Other methods which may be used are, for example, random pixel sub-sampling and black pixel conservation. These methods have the advantage of reducing the data size with a less severe loss of information. Scaling down is carried out on the stream of data that has been read out as it arrives at the controller 10, so as to generate a preview image. The preview image is thus generated on the fly.

The extracted data encoding the preview image is then written to a thumbnail file stored on the storage means 13 connected to the controller 10. The storage means 13 can be any means to store data, and for example, may comprise a solid state memory and/or a magnetic hard disk. In the implementation of the system in FIG. 1, the storage means 13 can be a hard disk in the scanning device 2, in the workstation 11, or a replaceable storage medium.

On the other hand, the primary stream of data, which encodes the scanned image in a format with a higher data size, is written to a master file on the storage means 13. Because the preview image encoded in the thumbnail file has a much smaller data size compared to the primary stream of data stored in the master file, it can be retrieved quickly and transferred between devices quickly without requiring databuses or network connections with a high bandwidth.

In the system of FIG. 2, the display means 14 comprise a display 15 in the scanning device 2 and a monitor 16 connected to the workstation 11. An example of a screen view 17 displayable on the display means 14 is shown in FIG. 4.

Figure 4:
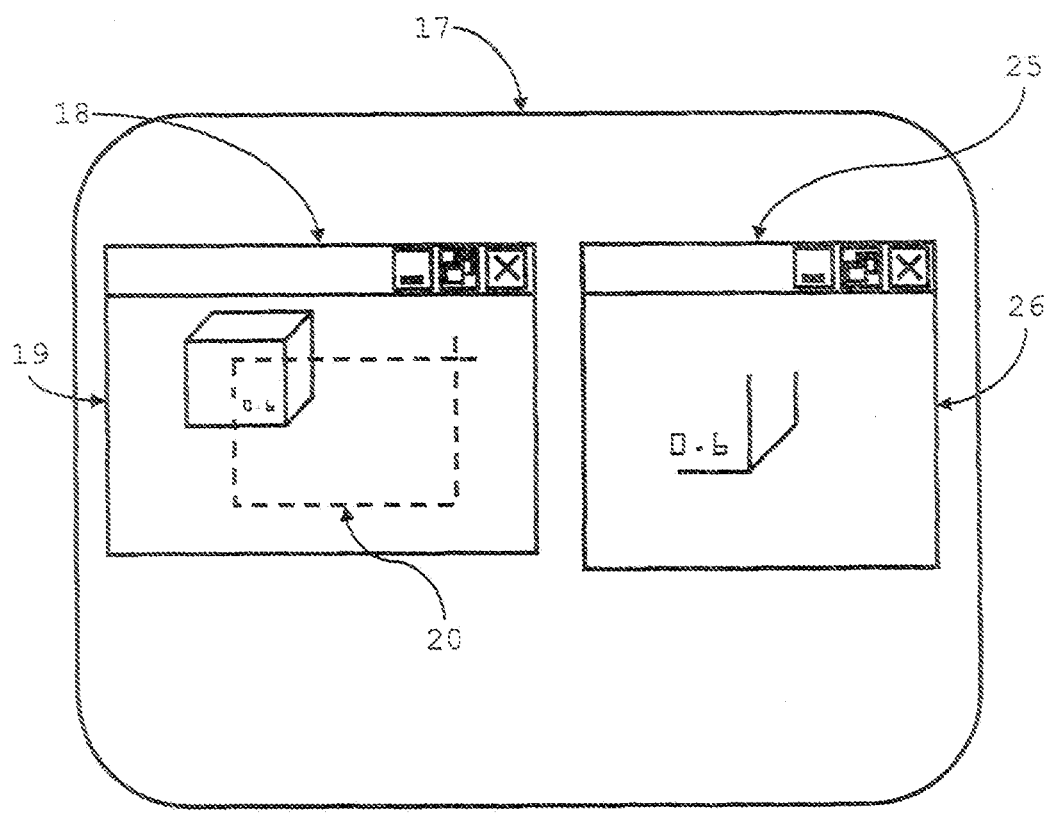
FIG. 4 is a schematic example of a screen view, provided during execution of an embodiment of a method of scanning and processing images according to the invention.

In FIG. 4, the screen view 17 comprises a first window 18 in which a survey view 19 is provided. The first window 18 is generated from the preview image. The survey view 19 can comprise all or part of the preview image. A system in which the operator can specify an area of the image to be used to provide the survey view 19 falls within the scope of the invention.

Completion of the generation of the thumbnail file marks the start of operation of the present system. In one embodiment, the survey view 19 is displayed after scanning the original sheet(s), once the thumbnail file has been completely stored.

In an advantageous alternative embodiment, the survey view 19 is built up on the fly, by directing the data stream encoding the preview image to the means 14 of display as well as to the thumbnail file. Thus, the operator can break off the scanning process if an error is detected halfway through.

In a preferred embodiment the scanning process comprises an image-processing step on the primary stream of data before the creation of the preview image. The image processing is preferably carried out on the stream of data read from the line buffer, i.e. on the fly, to decrease the burden on the controller 10. As an example, automatic background compensation can be carried out at this stage. By carrying out this algorithm on the fly, account can be taken of gradual variations in the background intensity level across a very large image. Alternative image processing algorithms that can be carried out on the primary data stream from which the master file and thumbnail file are created, include gamut mapping, deskewing and despeckling.

The survey view 19 is provided for two purposes. Firstly, it allows an operator to gain a quick first impression of the quality of the scanned image. Secondly, it is used to provide a graphical means of selecting an area of the scanned image encoded in the master file, in order to carry out a check of the quality of this scanned image, and also in order to check the legends for identification.

For the second purpose, the first window 18 comprises a selection frame 20 laid over the survey view 19. The input means 21 are provided with the system with which an operator can size and position the selection frame 20 within the first window 18 to select a Region of Interest (ROI). It will be understood that the input means 21 can comprise buttons on a control panel 22 of the scanning device 2, a mouse 23 or keyboard 24 connected to the workstation 11, a touch-sensitive screen mechanism, a voice-activated mechanism, etc. This will depend on the chosen implementation of the means of display 14, and is not essential to the invention.

The screen view 17 of FIG. 4 comprises a second window 25 including a detailed view 26 of the scanned image. The detailed view 26 corresponds to the ROI, but it is generated from the master file. The detailed view 26 thus allows a more thorough check of the quality of the scanned image encoded in the master file. By resizing and/or positioning the selection frame 20 within the first window 18 or by operating scroll bars (not shown) of the second window 25, the operator can select a particular area of the image that enables the most effective check of the quality. For example, this can be the annotation or a hatched area in a scanned engineering drawing. In one example, the default position of the selection frame 20 is at the legends, but can be at any other predesignated item or location.

Of course, the invention is not dependent on a particular arrangement of the detailed view 26 and the survey view 19 as shown in FIG. 4. For example, other implementations of the invention are possible, wherein the detailed view 26 and the survey view 19 are presented in one window, for example, wherein the part of the survey view 19 defined by the selection frame 20 is replaced by the detailed view 26 of the ROI. Alternatively, the first and second windows 18,25 can be sequentially displayed one over the other or one at a time.

In a further developed embodiment of the invention, the scanned image is checked for artifacts in step S12 and information specifying the detected artifacts is provided with the preview image. The image-processing step is used to check for artifacts, so the check of the image is also carried out by analyzing the data in the primary data stream on the fly.

An artifact in this context is a part of the encoded image that possesses certain predefined characteristics. Usually, this will be a departure from the normal, expected characteristics, indicative of a problem in the scanning process. For example, when certain lines are consistently black in a scan generated with the CCD array 9, this could be indicative of a contamination of the scanner 1. A uniformly gray area in the scanned image might be indicative of an area of considerable detail that is not adequately captured due to a scanning resolution that is too coarse.

An indication of the location and, optionally, the type of detected artifact is provided with the data destined for the thumbnail file. This indication is used to display automatically the affected area in the survey view 19 and/or the detailed view 26. As an enhancement, the affected area can be highlighted, for example in a different colour, in the survey view 19 and/or the detailed view 26, to draw the attention of the user. The type of artifact can be made known to the user, for example by using a different type of highlighting, an annotation, or some other means. Especially if the data encoding the preview image and the detected artifact is directly used to create the survey view 19, the user thus has at his disposal a means for quickly and automatically detecting problems in the scanning process. Scanning of the original can thus be cancelled at an early stage, if the user deems it necessary. If the artifact is not problematic, scanning can continue as normal.

After the document has been scanned, in step S27 of the flow diagram of FIG. 5, a scale ratio is used to translate coordinates $(x_T, y_T)$, representing the center point of the selection frame 20 in the preview image in the thumbnail file, into coordinates $(x_m, y_m)$ corresponding to the same position in the scanned image in the master file, so as to determine the location (coordinates) of the ROI. In a next step S28, the data encoding the ROI is extracted from the master file. The system then uses the extracted data to build up a detailed view 26.

In the diagram of FIG. 5, it can be seen that the system initially executes steps S27 and S28 immediately after step S12. In this initial phase, the system uses a default ROI or an ROI that has been specified in advance by the user.

A preferred embodiment of the system according to the invention allows the master file to be converted and stored in a different data format. Examples of such data formats that can be used are the Graphics Interchange Format, Tagged Image File Format, Portable Document Format and Computer Aided Acquisition and Logistics Support format.

Preferably, the controller 10 is capable of generating a compressed version of the master file. Some of the image formats just mentioned make use of a standard image compression algorithm, in which case the selection of a file format automatically entails the selections of a specific compression algorithm. Other file formats allow several types of compression to be used. Varieties of the invention wherein the compression algorithm and file format can be independently selected are possible. It is equally possible that the present system provides the user a choice of file formats and then automatically selects a default compression algorithm associated with the selected file format.

In the embodiment for which FIG. 5 provides a flow diagram, the operator is able to choose between several types of compression, or to choose no compression at all. The present system enables the operator to judge the effects of different types of compression before committing himself to one of them.

There are two categories of compression, lossy and lossless. A lossy compression algorithm results in a compressed image that comprises less information than the original. Lossy compression algorithms, for example, use a quantization step that rounds off coefficients encoding the image. A lossless compression algorithm does not result in loss of information, but does pare down the amount of data, typically by encoding the data in a more efficient way.

Whenever a lossy type of compression has been selected in step S25, the detailed view 26 is generated by first compressing the data encoding the ROI and then decompressing the compressed data in step S29. The present system then executes step S30 in which the detailed view 26 is displayed in the second window 25 or in some appropriate manner as discussed above. If a lossy type of compression is not selected in step S25, then step S30 is performed. Thus, the operator can judge whether the loss of data is acceptable, or whether a different file format should be chosen.

Because only the ROI is compressed and then decompressed, the operator is able to reach a conclusion fairly quickly. It is not necessary to compress the entire master file, thus saving time and processing capacity. The master file is only compressed and saved in its entirety in steps S31 and S32, when the operator has signalled his satisfaction by issuing the appropriate command, e.g., via the input means 21.

Preferably, the present system ensures that the part of the scanned image representing the region of interest is chosen to be larger than a size leading to compression artifacts. This feature is only meaningful in combination with certain types of compression algorithms. The algorithms decompose the image into a number of spatial frequency components. Distortion of the image occurs, when the number of pixels in the ROI is too small. In this case, the higher frequency components cannot be accurately determined. Reconstruction of the image, during decompression, will result in an image with artifacts, especially in the sections of the image adjacent to the boundaries. This can be prevented by ensuring that the ROI is large enough compared to the sample size of the compression algorithm.

Various implementations of the means of ensuring this are conceivable within the scope of the invention. It is also possible to prevent a user from resizing the selection frame 20 below certain dimensions. Another variant would be to increase the size of the selected ROI to the specified minimum dimensions automatically.

FIG. 5 illustrates the fact that the user can try out several different file formats before committing himself to one of them. If the detailed view 26 generated on the display means 14 in step S30 is not satisfactory, the file format can be changed in step S38 and then steps S25, S29 and S30 are repeated.

On the other hand, if the user desires to check several parts of the image, the selection frame 20 can be resized or moved in step S39, in which case the system returns to step S27 to generate a new detailed view 26 of the ROI that has now been selected. An automatic return to step S27 implies an embodiment of the invention wherein the detailed view 26 is automatically updated upon resizing or repositioning of the selection frame 20. In variants of the present system, the access time of the file storage means 13 or the bandwidth of connections between the controller 10 and file storage means 13 could be limited compared to the amount of data encoding the image in the master file. In that case, a trigger, e.g. a user command, could be specified to start the build-up of the detailed view 26. This would make the system faster.

Finally, the user has the option to indicate his satisfaction by issuing the command to save the master file, e.g., using the input means 21 (step S40). If the master file is not to be saved, then the process returns to step S38. But, when the user has entered the appropriate command, the master file is saved. Whenever a certain type of image compression has been specified (step S41), either explicitly or implicitly through the selection of a file format that involves image compression, the master file will be compressed in step S31, before being saved in the specified file format in step S32.

The invention can be used both to scan documents to create an electronic archive, or for copying documents. The schematic diagram of FIG. 1 shows a printing device 33 connected to the controller 10. In FIG. 2, this is implemented in the shape of a printer 34 with a document folder and collator 35 attached. The arrangement of FIG. 2 is especially useful for generating copies of wide-format documents.

The printing device 33 can use any number of printing techniques. It can be a thermal inkjet printer, a pen plotter, or a press system based on organic photoconductor technology, for instance.

To illustrate the use of the invention in connection with an electronic archive, the system of FIG. 1 comprises several terminals 36. The terminals 36 can gain access to the file storage means 13 through a network 37. In this case, access involves the controller 10, but it will be understood that where the file storage means 13 comprise a separate server, this server would be directly connected to the network 37.

For ease of access, the thumbnail file is preferably saved with the master file. An archive manager 38 is used to display at least part of the image encoded in the thumbnail file to the user of a terminal 36. The archive manager 38 can be part of the controller 10 as shown in FIG. 1, but can be part of any other element or be an independent element. Indeed, a number of survey previews of stored images can be provided in a menu. This enables the user to recognize the image. Because there is less data in the thumbnail file, the archive manager can build up the selection menu with the survey previews quickly, and more previews can be used. Because the thumbnail files that have originally been created during the scanning process are used, there is no need to wait for the system to recreate the survey previews from the stored master files. Thus, the user can browse through the repository of images in the stored master files.

The steps of the present method according to the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

It will be obvious to those skilled in the art that the invention is not limited to the described embodiments, but can be varied within the scope of the claims. In particular, the description is not intended to limit the invention to certain categories of image compression, being merely intended to be applicable to several of the most common types of image compression and file formats.

The invention claimed is:

1. An image scanning and processing system, comprising:
a scanner for scanning an image, configured to generate a stream of data encoding a scanned image;
a controller configured to control and process data received from the scanner, wherein the controller is configured to derive from a stream of data a primary stream to be stored in the master file, and a separate stream to create a preview image; and
a file storage device configured to store the master file including data from the primary stream of data,
wherein the controller creates the preview image with a lower data size than the scanned image from the separate stream,
wherein the controller extracts data encoding the preview image from the separate stream of data on the fly, before the scanning of the image is finished, and writes the extracted data to a thumbnail file, thereby creating the preview image,
wherein the controller scales down the scanned image when the stream of data encoding the scanned image arrives at the controller, thereby extracting the data encoding the preview image from the separate stream of data.

2. The system according to claim 1, further comprising:
a display unit configured to display at least a portion of the preview image and to display a detailed view of a section of the displayed preview image according to a user's selection of the section.

3. The system according to claim 2, wherein the display unit is configured to provide a selection frame with which the user makes the user's selection of the section, the selection frame being resizable and movable.

4. The system according to claim 2, wherein the controller is configured to convert the selected section of the preview image to a different data format before being displayed.

5. The system according to claim 1, wherein the scanner or the controller is configured to check the scanned image for artifacts, and to store information specifying the detected artifacts with the preview image in the file storage device.

6. The system according to claim 1, further comprising:
an inkjet printing device configured to print the preview image and/or the scanned image.

7. A method of scanning and processing an image, comprising:
scanning an original and thereby generating a stream of data;
deriving from the stream of data a primary stream to be stored in a master file, and a separate stream to create a preview image;
encoding a scanned image based on the primary stream;
saving the scanned image in the master file; and
creating the preview image with a lower data size than the scanned image from the separate stream,
wherein data encoding the preview image is extracted from the separate stream of data on the fly, before the scanning of the image is finished, and is written to a thumbnail file, thereby creating the preview image,
wherein the step of extracting the data encoding the preview image from the separate stream of data on the fly includes scaling down the scanned image upon receiving the stream of data, thereby extracting the data encoding the preview image from the separate stream of data.

8. The method according to claim 7, wherein the preview image is a lower resolution rendition of at least part of the scanned image.

9. The method according to claim 7, wherein at least part of the preview image is displayed to an operator as a survey view in a window on a display.

10. The method according to claim 9, wherein the part of the preview image is displayed before or during the saving to the thumbnail file.

11. The method according to claim 9, further comprising:
providing a selection frame in the survey view, wherein an operator selects a region of interest by sizing and positioning the selection frame in the survey view.

12. The method according to claim 7, wherein part of the scanned image representing a region of interest is displayed to an operator as a detailed view of the region of interest in a window on a display.

13. The method according to claim 12, wherein the part of the scanned image representing the region of interest is converted to a different data format before being displayed.

14. The method according to claim 13, wherein the part of the scanned image representing the region of interest is compressed when converted to the different data format and decompressed before being displayed.

15. The method according to claim 14, wherein the part of the scanned image representing the region of interest is chosen to be larger than a size leading to compression artifacts.

16. The method according to claim 7, further comprising:
image-processing the stream of data before creation of the preview image.

17. The method according to claim 7, wherein the scanned image is checked for artifacts, and wherein information specifying the detected artifacts is provided with the preview image.

18. A method for selecting one of a plurality of master files comprising data encoding at least one scanned image, wherein the master file is created by scanning an original and thereby generating a stream of data, deriving from the stream of data a primary stream to be stored in a master file, and a separate stream to create a preview image, encoding a scanned image on the primary stream, and saving the scanned image in the master file, the method comprising:
providing at least part of a thumbnail file associated with one of the master files to an archive manager, said part of the thumbnail file including data encoding the preview image corresponding to the scanned image with a lower data size than the scanned image, from the separate stream, whereby the archive manager can display the parts as survey previews to the user for selection,
wherein the data encoding the preview image is extracted from the separate stream of data on the fly, before the scanning of the image is finished, and is written to a thumbnail file, thereby creating the preview image,
wherein the step of extracting the data encoding the preview image from the separate stream of data on the fly includes scaling down the scanned image upon receiving the stream of data, thereby extracting the data encoding the preview image from the separate stream of data.

* * * * *